(12) United States Patent
Cunningham et al.

(10) Patent No.: US 10,480,977 B2
(45) Date of Patent: Nov. 19, 2019

(54) METHOD FOR GENERATING A DIAGNOSTIC FROM A DEVIATION OF A FLOW METER PARAMETER

(75) Inventors: Timothy J. Cunningham, Boulder, CO (US); Andrew Timothy Patten, Boulder, CO (US)

(73) Assignee: Micro Motion, Inc., Boulder, CO (US)

( * ) Notice: Subject to any disclaimer, the term of this patent is extended or adjusted under 35 U.S.C. 154(b) by 956 days.

(21) Appl. No.: 12/936,564

(22) PCT Filed: May 1, 2008

(86) PCT No.: PCT/US2008/062295
§ 371 (c)(1),
(2), (4) Date: Oct. 6, 2010

(87) PCT Pub. No.: WO2009/134268
PCT Pub. Date: Nov. 5, 2009

(65) Prior Publication Data
US 2011/0029259 A1 Feb. 3, 2011

(51) Int. Cl.
*G01F 1/84* (2006.01)
*G01F 25/00* (2006.01)

(52) U.S. Cl.
CPC ........ *G01F 1/8477* (2013.01); *G01F 25/0007* (2013.01)

(58) Field of Classification Search
CPC .................................................. G01F 25/0007
USPC ........................................................ 702/47
See application file for complete search history.

(56) References Cited

U.S. PATENT DOCUMENTS

| 3,952,577 | A | * | 4/1976 | Hayes | ....................... G01F 1/36 73/54.04 |
|---|---|---|---|---|---|
| 5,661,232 | A | | 8/1997 | Van Cleve et al. | |
| 7,295,934 | B2 | | 11/2007 | Hairston | |
| 2007/0084298 | A1 | * | 4/2007 | Rieder et al. | ............ 73/861.356 |
| 2008/0141789 | A1 | | 6/2008 | Kassubek et al. | |
| 2008/0215259 | A1 | * | 9/2008 | Hairston | ......................... 702/47 |

(Continued)

FOREIGN PATENT DOCUMENTS

| CN | 1076027 A | 9/1993 |
|---|---|---|
| CN | 1309283 A | 8/2001 |

(Continued)

OTHER PUBLICATIONS

Fluid Dynamics and Thermal Conduction, Zou Hua-sheng et al., South China University Press. Aug. 31, 2004.

(Continued)

*Primary Examiner* — Manuel A Rivera Vargas
(74) *Attorney, Agent, or Firm* — The Ollila Law Group LLC

(57) ABSTRACT

A method for detecting a deviation in a flow meter parameter of a flow meter that is adapted to measure a fluid flow rate is provided. The method comprises measuring a differential pressure across at least a portion of the flow meter. The method further comprises comparing the measured differential pressure to an expected differential pressure; the expected differential pressure being based on the measured flow rate. The method further comprises detecting a deviation in the flow meter parameter if the difference between the measured differential pressure and the expected differential pressure exceeds a threshold limit.

7 Claims, 3 Drawing Sheets

(56) References Cited

U.S. PATENT DOCUMENTS

2010/0191481 A1* 7/2010 Steven .......................... 702/47
2010/0206090 A1* 8/2010 Stack ................... G01F 1/8477
                                                          73/861.357

FOREIGN PATENT DOCUMENTS

| EP | 1821082 | A2 | 8/2007 |
|----|---------|----|--------|
| FR | 2860868 | A1 | 4/2005 |
| JP | 49617 | A | 1/1992 |
| JP | 2000505557 | A | 5/2000 |
| JP | 2002502022 | A | 1/2002 |
| JP | 2003270010 | A | 9/2003 |
| JP | 2003294504 | A | 10/2003 |
| JP | 200889373 | A | 4/2008 |
| RU | 2164009 | C2 | 10/2001 |
| WO | 9220006 | A2 | 11/1992 |
| WO | 9605484 | A1 | 2/1996 |
| WO | 99139164 | A1 | 8/1999 |
| WO | 2008025935 | A1 | 3/2008 |

OTHER PUBLICATIONS

Cumming I W et al: "Prediction of deposit depth and transmembrane pressure during crossflow microfiltration" Journal of Membrane Science, Elsevier Scientific Publ. Company. Amsterdam, NL, vol. 154, No. 2 Mar. 17, 1999 (Mar. 17, 1999) pp. 229-237, XP004153964.

* cited by examiner

METHOD FOR GENERATING A DIAGNOSTIC FROM A DEVIATION OF A FLOW METER PARAMETER

TECHNICAL FIELD

The present invention relates to flow meters, and more particularly, to a method for generating a diagnostic using a deviation in a flow meter parameter.

BACKGROUND OF THE INVENTION

It is generally known to use Coriolis effect mass flow meters to measure mass flow and other information for materials flowing through a conduit in the flow meter. Exemplary Coriolis flow meters are disclosed in U.S. Pat. Nos. 4,109,524, 4,491,025, and Re. 31,450 all to J. E. Smith et al. These flow meters have one or more conduits of straight or curved configuration. Each conduit configuration in a Coriolis mass flow meter has a set of natural vibration modes, which may be of simple bending, torsional, or coupled type. Each conduit can be driven to oscillate at resonance in one of these natural modes. Material flows into the flow meter from a connected pipeline on the inlet side of the flow meter, is directed through the conduit or conduits, and exits the flow meter through the outlet side of the flow meter. The natural vibration modes of the vibrating, material filled system are defined in part by the combined mass of the conduits and the material flowing within the conduits.

When there is no flow through the flow meter, all points along the conduit oscillate due to an applied driver force with identical phase or small initial fixed phase offset which can be corrected. As material begins to flow through the flow meter, Coriolis forces cause each point along the conduit to have a different phase. For example, the phase at the inlet end of the flow meter lags the driver, while the phase at the outlet leads the driver. Pick-off sensors on the conduit(s) produce sinusoidal signals representative of the motion of the conduit(s). Signals output from the pick-off sensors are processed to determine the phase difference between the pick-off sensors. The phase difference between the two or more pick-off sensors is proportional to the mass flow rate of material through the conduit(s).

Coriolis mass flow meters have received great success in a wide variety of industries. However, Coriolis flow meters along with most other flow meters can suffer from an accumulation of deposits left by the process fluid. This accumulation is generally referred to in the art as "coating." Depending on the characteristics of the process fluid, the fluid coating may or may not affect the flow meter's performance and accuracy. Although the coating generally will not affect the flow meter's stiffness nor cause a flow rate measurement error, it can affect other aspects of the flow meter's characteristics. For example, the coating may have a different density than the process fluid. This can adversely affect the density reading obtained from the flow meter. With certain process fluids, the coating may build up inside the flow meter to a certain thickness and then break off as small flakes. These small flakes may affect other parts of the process connected to the flow meter. In extreme circumstances, the coating may build up enough such that the flow meter becomes plugged requiring complete shut down or in some circumstances, a complete replacement of the flow meter.

Other problems may be caused by coating, plugging, inconsistent process fluid compositions, changes in temperature of the process fluid, etc. For example, in the paint industry, the same flow meter may be used for multiple paint colors. Therefore, even though the coating may not cause meter reading errors, the coating could adversely affect the end product.

Because of the above problems, along with others caused by coating, it is desirable to diagnose when there is flow meter coating. Prior art diagnostic methods of detecting flow meter coating have a number of problems. First, many of the prior art methods are limited to coating detection in the active section of the flow tube, i.e., the vibrating section. Other limitations of the prior art arise in situations where the density of the coating is substantially similar to the process fluid. In those circumstances, density based coating detection is not available. Therefore, there is a need in the art for a coating detection method that overcomes the above mentioned limitations. Furthermore, in applications where it is known that the process fluid coats the flow meter, it is desirable during cleaning of the flow meter to be able to detect when the meter is completely uncoated.

ASPECTS

According to an aspect of the invention a method for detecting a deviation in a flow meter parameter, comprises the steps of:

measuring a differential pressure across at least a portion of the flow meter;

comparing the measured differential pressure to an expected differential pressure based on the measured flow rate; and detecting a deviation in the flow meter parameter if the difference between the measured differential pressure and the expected differential pressure exceeds a threshold limit.

Preferably, the method further comprises the step of measuring a differential pressure across the entire flow meter.

Preferably, the expected differential pressure is based on a known fixed fluid viscosity.

Preferably, the expected differential pressure is obtained from a previously prepared plot of differential pressure v. flow rate.

Preferably, the method further comprises the step of storing the expected differential pressure in a meter electronics.

Preferably, the threshold limit comprises a predetermined value.

Preferably, the flow meter comprises a Coriolis flow meter.

Preferably, the deviation in the flow meter parameter indicates a coating in the flow meter.

According to another aspect of the invention, a method for detecting a deviation in a flow meter parameter, comprises the steps of:

measuring a differential pressure across the flow meter;

calculating an expected fluid flow rate based on the differential pressure; and comparing the measured fluid flow rate to the calculated fluid flow rate and detecting a deviation in the flow meter parameter if the difference between the measured fluid flow rate and the calculated fluid flow rate exceeds a threshold limit.

Preferably, the step of calculating an expected fluid flow rate comprises the step of characterizing the flow meter to an orifice meter.

Preferably, the method further comprises the step of determining a flow meter coefficient.

Preferably, the method further comprises the step of storing the expected fluid flow rate in meter electronics.

Preferably, the threshold limit comprises a predetermined value.

Preferably, the flow meter comprises a Coriolis flow meter.

Preferably, the deviation in the flow meter parameter indicates a coating in the flow meter.

According to another aspect of the invention, a method for detecting a deviation in a flow meter parameter, comprises the steps of:

measuring a differential pressure across at least a portion of the flow meter;

calculating a friction factor based on a measured flow rate and the measured differential pressure; and comparing the calculated friction factor to an expected friction factor based on the measured flow rate and detecting a deviation in the flow meter parameter if the difference between the calculated friction factor and the expected friction factor exceeds a threshold limit.

Preferably, the step of calculating a friction factor comprises using the equation:

$$f = \frac{D\Delta P}{2\overline{V}^2 \rho L}.$$

Preferably, the expected friction factor is obtained from a previous measurement.

Preferably, the differential pressure is measured across the entire flow meter.

Preferably, the expected friction factor is calculated based on a Reynold's number for the measured flow rate.

Preferably, the method further comprising the step of storing the expected friction factor in meter electronics.

Preferably, the flow meter comprises a Coriolis flow meter.

Preferably, the deviation in the flow meter parameter indicates a coating in the flow meter.

According to another aspect of the invention, a method for detecting a deviation in a flow meter parameter, comprises the steps of:

measuring a flow tube temperature in a plurality of locations; and calculating a temperature gradient based on the measured temperatures and detecting a deviation in the flow meter parameter if the calculated temperature gradient exceeds a temperature gradient threshold.

Preferably, the step of calculating a temperature gradient comprises calculating a temperature gradient from a flow meter inlet to a flow meter outlet.

Preferably, the step of calculating a temperature gradient comprises calculating a temperature gradient from a first flow tube to a second flow tube.

Preferably, the method further comprises the step of detecting a coating in the flow meter if the calculated temperature gradient changes by more than threshold limit.

Preferably, the temperature gradient threshold is predetermined.

Preferably, the flow meter comprises a Coriolis flow meter.

Preferably, the deviation in the flow meter parameter indicates a coating in the flow meter.

DETAILED DESCRIPTION OF THE INVENTION

FIGS. 1-4 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
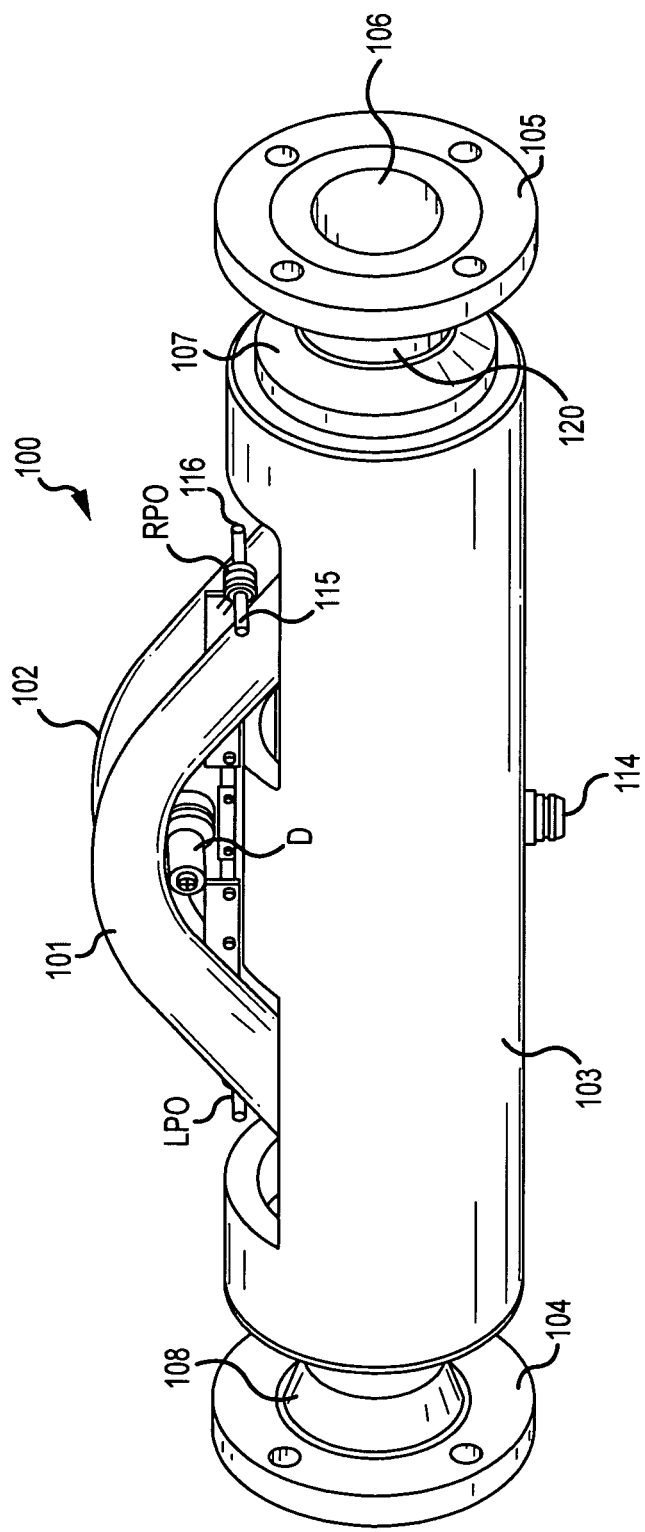
FIG. 1 shows a flow meter according to an embodiment of the invention.

FIG. 1 shows a flow meter 100 according to an embodiment of the invention. According to one embodiment of the invention, the flow meter 100 comprises a Coriolis flow meter. However, the present invention is not limited to applications incorporating Coriolis flow meters, and it should be understood that the present invention could be used with other types of flow meters. The flow meter 100 comprises a spacer 103 enclosing the lower portion of the flow tubes 101, 102 which are internally connected on their left ends to flange 104 via its neck 108 and which are connected on their right ends via neck 120 to flange 105, and manifold 107. Also shown in FIG. 1 are the outlet 106 of flange 105, left pick-off LPO, right pick-off RPO, and driver D. The right pick-off RPO is shown in some detail and includes magnet structure 115 and coil structure 116. Element 114 on the bottom of manifold spacer 103 is an opening for receiving from meter electronics (not shown) a wire (not shown) that extends internally to driver D and pick-offs LPO and RPO. Flow meter 100 is adapted when in use to be connected via flanges 104 and 105 to a pipeline or the like.

Figure 2:
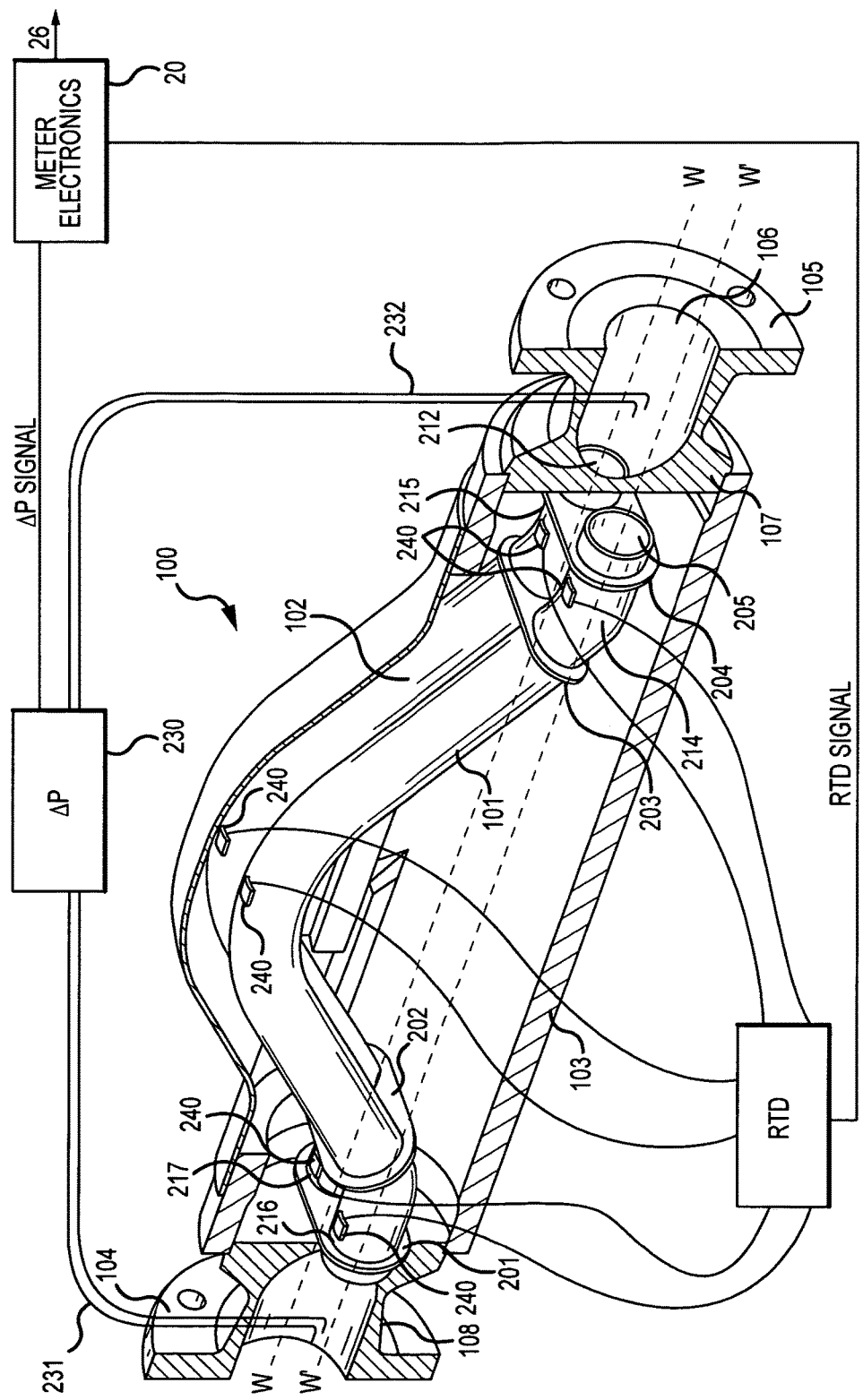
FIG. 2 shows a partial cross section view of the flow meter according to an embodiment of the invention.

FIG. 2 shows a cut away view of the flow meter 100. This view removes the front portion of manifold spacer 103 so that parts internal to the manifold spacer may be shown. The parts that are shown on FIG. 2, but not on FIG. 1, include outer end brace bars 201 and 204, inner brace bars 202 and 203, right end flow tube outlet openings 205 and 212, flow tubes 101 and 102, curved flow tube sections 214, 215, 216, and 217. In use, flow tubes 101 and 102 vibrate about their bending axes W and W'. The outer end brace bars 201 and 204 and the inner brace bars 202 and 203 help determine the location of bending axes W and W'.

Figure 4:
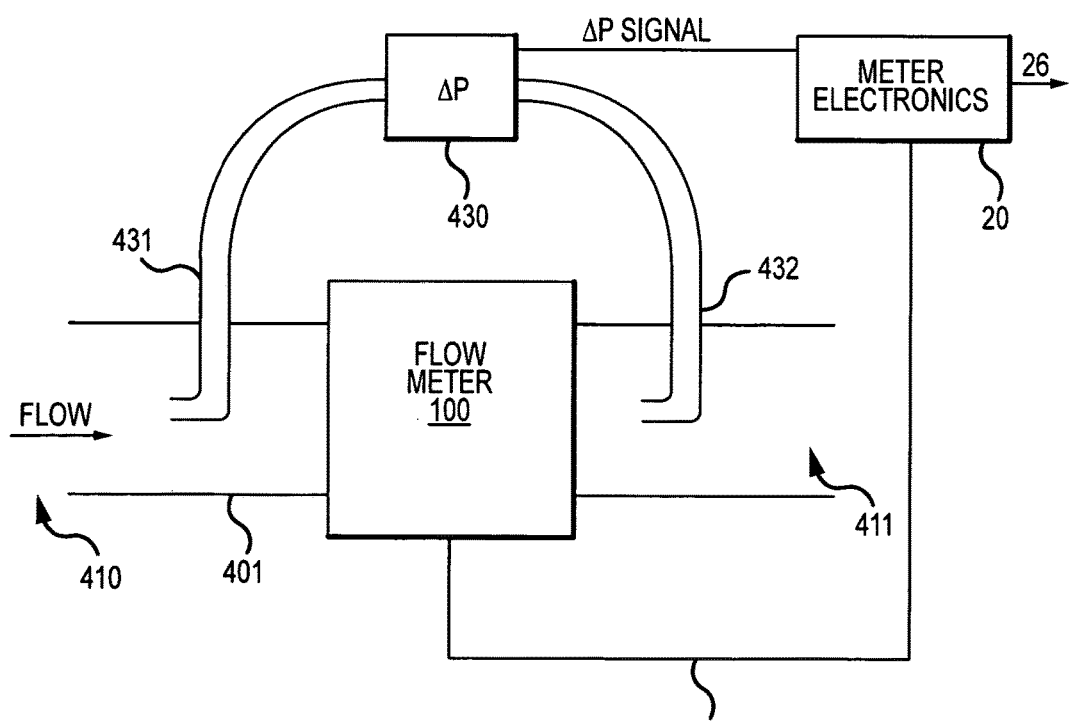
FIG. 4 shows a block diagram of the flow meter according to an embodiment of the invention.

According to the embodiment shown in FIG. 2, the flow meter 100 includes a pressure sensor 230. According to an embodiment of the invention, pressure sensor 230 comprises a differential pressure sensor. Pressure sensor 230 is connected to the flow meter 100 by means of pressure taps 231 and 232 to obtain a pressure reading. The taps 231 and 232 allow pressure sensor 230 to continuously monitor the material pressure drop across flow meter 100. It should be noted that although the taps 231, 232 may be connected to the flow meter 100 at any desired location, according to the embodiment shown in FIG. 2, the taps 231, 232 are connected at the flanges 104, 105 respectively. Advantageously, pressure sensor 230 may obtain a differential pressure measurement for the entire flow meter 100 and not just the active portion of the flow meter 100. In other embodiments, such as shown in FIG. 4 below, the pressure taps 231, 232 may be located in the pipeline to which the flow meter is connected. The differential pressure measurement is described further below.

FIG. 2 also shows a plurality of temperature sensing devices 240. According to the embodiment shown in FIG. 2, the temperature sensing devices comprise RTD sensors. However, it should be understood that other temperature measuring devices may be implemented and the present invention should not be limited to RTD sensors. Similarly, although six RTD sensors 240 are shown, it should be understood that any number of RTD sensors may be implemented and still fall within the scope of the present invention.

Both the pressure sensor 230 and the RTD sensors 240 are shown connected to meter electronics 20 via leads ΔP signal and RTD signal, respectively. As described in FIG. 1, the left and right pick-off sensors, LPO, RPO, as well as driver D, which are shown in FIG. 1, are also connected to meter electronics 20. Meter electronics 20 provides mass flow rate and totalized mass flow information. In addition, mass flow rate information, density, temperature, pressure, and other flow characteristics can be sent to downstream process control and/or measurement equipment via lead 26. Meter electronics 20 may also comprise a user interface that allows a user to input information such as fluid viscosity along with other known values. According to an embodiment of the invention, meter electronics 20 comprises a hard drive capable of storing known information or calculated information for future retrieval. This stored information is discussed further below.

Figure 3:
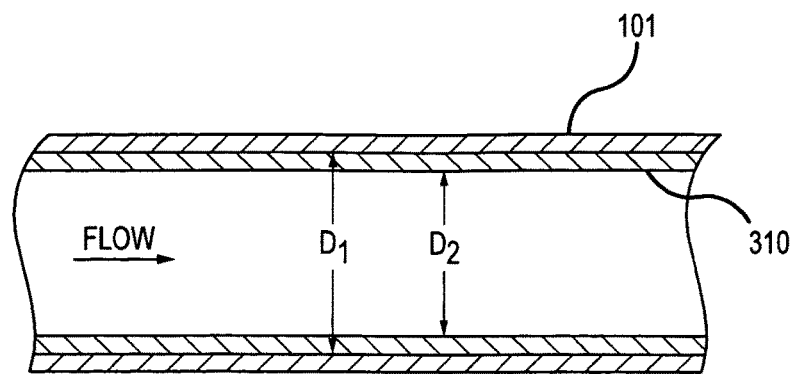
FIG. 3 shows a cross section view of a flow tube with a coating formed inside the flow tube.

FIG. 3 shows a cross section view of a portion of the flow tube 101 with a coating 310. Although only a portion of flow tube 101 is shown, it should be appreciated that coating 310 may also form inside flow tube 102 as well as other parts of the flow meter 100 exposed to a process fluid. As the process fluid flows through the flow tube 101, deposits of the process fluid may be left behind. Over time, these deposits form a coating 310. The coating 310 may cover substantially the entire inside diameter of the flow tube 101 as shown, or alternatively, the coating 310 may be formed in certain areas of the flow tube 101, while other areas are free from coating 310. Furthermore, although, the coating 310 in a particular application may not be as thick as shown in FIG. 3, in some processes the coating 310 becomes thick enough to substantially plug the flow meter 100. Even if the coating 310 is not thick enough to plug the flow meter 100, it can reduce the cross sectional area provided for the process fluid to flow through. For example, the flow tube 101 may have an internal diameter of $D_1$; however, with the coating 310 present, the actual allowable diameter in which the process fluid can flow through is reduced to $D_2$.

Because the coating 310 might adversely affect the performance of the flow meter 100, the present invention provides alternative methods for determining the presence of coating 310 within the flow meter 100. Furthermore, while prior art methods are limited to detecting coating 310 only in the active part, i.e., the vibrating section of the flow tubes 101, 102, the present invention is capable of detecting coating 310 in all sections of the flow meter 100, including the manifolds 104, 105. It should be understood however, that the present invention is not limited to the detection of coating, but rather the present invention provides alternative methods for detecting a deviation in a flow meter parameter. The flow meter parameter may be any measurement that is obtained from the flow meter. In some embodiments the deviation in the flow meter parameter is caused by coating 310. However, other things may cause the deviation in the flow meter measurement as well, such as plugging of the meter, inconsistent temperatures, inconsistent process fluid mixtures, bubbles that form in the flow meter, etc. Therefore, according to an embodiment of the invention, the methods provided below detect a deviation in a flow meter parameter, which may provide a diagnostic that further investigation is required.

A deviation in a flow meter parameter may be detected according to one of the methods described below. According to an embodiment of the invention, a deviation in a flow meter parameter is detected directly from the differential pressure measurement obtained from pressure sensor 230. At the factory, or alternatively, on site when it is known there is no coating 310 in the flow meter 100, for example, a plot of differential pressure across a portion of the flow meter 100 versus mass flow rate can be prepared for a known fixed fluid viscosity. Based on this plot, an expected differential pressure can be determined for a given flow rate. The actual differential pressure can then be continuously monitored using the pressure sensor 230 and compared to the expected differential pressure for the measured flow rate. If the actual differential pressure is within a threshold limit of the expected differential pressure, meter electronics 20 can send a signal that no deviation in the parameter is detected, or alternatively, little deviation has been detected in the flow meter parameter. If on the other hand, the measured differential pressure falls outside of the threshold limit, meter electronics 20 can flag the measurement for further investigation. According to one embodiment of the invention, the threshold limit comprises a predetermined value. According to another embodiment of the invention, the threshold limit is set by a user or operator.

Although this approach provides satisfactory results, there are a number of limitations using this direct comparison approach. First, the user must know the viscosity of the process fluid. Additionally, the viscosity must remain substantially constant. This is because the expected differential pressure obtained from the previous measurements along with the actual differential pressure is dependent on the viscosity of the process fluid. Because of this limitation, a change in the differential pressure may be significant of a condition other than coating, thereby giving a false coating indication.

Another method for detecting a deviation in a flow meter parameter is to characterize the flow meter 100 as an orifice meter. Orifice meters are generally known and are used to measure a fluid flow based on a differential pressure. They have certain advantages over other meters that measure fluid flow based on a differential pressure because they occupy much less space. An orifice meter operates by providing a plate with a hole in a pipe, where the hole is smaller than the diameter of the pipe. This reduction in the cross sectional area provided for fluid flow increases the velocity head at the expense of the pressure head. This differential pressure can be measured by pressure taps before and after the plate. Using the measured differential pressure, a fluid velocity can be calculated based on an equation such as, for example:

$$V_o = \frac{C_o}{\sqrt{1-\beta^4}} \sqrt{\frac{2\Delta P}{\rho}} \qquad (1)$$

Where:
V_o=velocity through the orifice
β=ratio of orifice diameter to pipe diameter
ΔP=differential across the orifice
ρ=fluid density
C_o=orifice coefficient It should be understood that other equations are known to calculate a fluid flow rate using an orifice meter and equation (1) is merely an example, which should not limit the scope of the invention. Generally, all of the unknowns can be measured or are known, except for the orifice coefficient, $C_o$, which is typically determined experimentally and varies from meter to meter. It is typically dependent on both β and the Reynold's number, which is a dimensionless number and is defined as:

$$\text{Re} = \frac{D\overline{V}\rho}{\mu} = \frac{D\overline{V}}{\upsilon} \tag{2}$$

Where:
D=diameter
$\overline{V}$=average liquid velocity
μ=fluid viscosity
ρ=fluid density
υ=kinematic fluid viscosity For many orifice meters, the orifice coefficient, $C_o$, remains almost constant and is independent for Reynold's numbers greater than approximately 30,000. Like an orifice meter, the flow meter 100 experiences a measurable drop in pressure and can be viewed as an orifice meter as shown in FIG. 4.

FIG. 4 shows the flow meter 100 positioned within a pipeline 401 and connected to meter electronics 20. In FIG. 4, the internal structure of the flow meter 100 is not shown, but rather, the flow meter 100 is shown as a simple block diagram. During experimental testing, the flow meter 100 can be characterized as an orifice meter. In other words, the pressure sensor 430 can measure the differential pressure between the inlet 410 of the flow meter 100 and the outlet 411 using the pressure taps 431, 432, respectively. With the variables of equation (1) either known or easily obtainable by measurement and the flow meter 100 determining a flow rate, a flow meter coefficient can be determined experimentally. The flow meter coefficient being similar to an orifice coefficient. Once the flow meter coefficient is known, a flow rate can be calculated based on the differential pressure across the flow meter 100 based on the same principals as a flow rate is determined using an orifice meter.

During normal operation, the flow rate measured by the flow meter 100 can be compared to an expected flow rate obtained by a calculation using equation (1) or a similar equation used for calculating flow rates based on an orifice meter. If the expected flow rate falls outside of a threshold difference from the flow rate obtained from the flow meter 100, meter electronics 20 may signal a deviation in the flow meter parameter. The deviation may be caused by the presence of coating 310 within the flow meter 100. However, the deviation may be caused by something other than coating 310. If on the other hand, the expected flow rate obtained by characterizing the flow meter as an orifice falls within a threshold difference of the measured flow rate obtained by flow meter 100, meter electronics 20 may signal little or no deviation in the flow meter parameter. It should be understood that the threshold difference may be predetermined or may be determined by an operator based on the particular circumstances.

Another method for detecting the presence of a deviation in a flow meter parameter, which provides higher accuracy and broader applicability than the previously mentioned approaches, is to use a friction factor, such as the fanning friction factor, f. Other friction factors are generally known in the art such as the Darcy Weissbach friction factor, which is approximately 4f. It should be understood that the particular friction factor used is not important for the purposes of the present invention as any applicable equations can be adjusted according to the friction factor used.

It is generally known in the art that pressure drop through pipes can be quantified and adjusted by using a friction factor f. First, it is important to understand how to characterize a process fluid flowing through a circular pipe. For the purpose of this embodiment, the flow meter 100 can be characterized as a circular pipe having a known inner diameter and length. One important number in characterizing fluid flow through a pipe is the use of the Reynold's number, Re, described above in equation (2). It should be noted that the tube diameter, D, can be easily determined and is generally known at the factory. Many flow meters, including Coriolis flow meters are capable of measuring fluid aspects, such as the fluid density and the mass flow rate. From these two quantities, the average liquid velocity can be calculated. The fluid viscosity can also be determined based on a known, a calculated, or a measured value.

The friction factor of a system is defined as the ratio of the wall shear stress to the product of the density and the velocity head ($\overline{V}^2/2$). It is often useful for incompressible fluid flow systems to characterize the friction factor, f in terms of the Reynold's number, Re. The exact equation varies depending on the particular characteristics of both the fluid as well as the pipe through which the fluid is flowing. It should be understood that the equations that follow are merely examples and other similar equations are generally known in the art. Therefore, the equations outlined below should not limit the scope of the invention. For laminar flow through a smooth pipe, the friction factor, f can be characterized as:

$$f = \frac{16}{\text{Re}} \tag{3}$$

In contrast, for turbulent flow through a smooth pipe, the friction factor, f can be characterized as:

$$\frac{1}{\sqrt{f/2}} = 2.5\ln\left(\text{Re}\sqrt{f/8}\right) + 1.75 \tag{4}$$

Equation (4) can be used with reasonable accuracy for $10^4 < \text{Re} < 10^6$. Other equations are also known for correlating the friction factor to the Reynold's number such as:

$$f = .046\,\text{Re}^{-.2} \tag{5}$$

$$f = .0014 + \frac{.125}{\text{Re}^{.32}} \tag{6}$$

Equation (5) is generally applicable for $50,000<Re<10^6$ and equation (6) is generally applicable for $3,000<Re<3\times 10^6$. Based on equation 1 and any of equations 3-6, the friction factor of the system can be determined with the only unknown being the viscosity. Depending on the flow rate, changes in the viscosity may be insignificant. Alternatively, the user could enter a nominal viscosity.

It is also generally known in the art that the friction factor f can be characterized in terms of the pressure drop $\Delta P$ through a system as follows:

$$f = \frac{D\Delta P}{2\overline{V}^2 \rho L} \qquad (7)$$

Where:
$\Delta P$=Differential pressure
L=length of tube between pressure taps
f=friction factor
$\overline{V}$=average fluid velocity
$\rho$=fluid density
D=tube diameter The differential pressure can be obtained by pressure sensor 230; the length of the flow meter 100 between the pressure taps 231, 232 can be easily measured; the tube diameter can also be easily measured; the fluid density can be obtained from the flow meter 100, and the average velocity can be obtained based on the mass flow rate and the density measured from the flow meter 100. Therefore, all of the variables on the right hand side of equation (7) can be found.

According to an embodiment of the invention, a diagnostic is generated based on the presence of a deviation in a flow meter parameter by comparing a calculated friction factor, $f_c$ based on a differential pressure to an expected friction factor $f_e$. The expected friction factor $f_e$ can be obtained in a number of different ways. According to one embodiment of the invention, an expected friction factor $f_e$ can be determined either at the factor or on site, when it is known that there is little or no coating present. The expected friction factor $f_e$ can be obtained based on various flow rate measurements and therefore a curve of friction factor v. flow rate can be prepared. The expected friction factor, $f_e$ can be prepared in advance and stored in meter electronics 20. According to another embodiment of the invention, the expected friction factor $f_e$ can be calculated based on a correlation to the Reynold's number obtained during normal operation.

During normal operation according to an embodiment of the invention, the pressure sensor 230 can obtain a differential pressure measurement of the flow meter 100. Additionally, the flow meter 100 can obtain a flow rate measurement. From the flow rate measurement along with the differential pressure measurement, a calculated friction factor $f_c$ can be calculated from equation (7). This calculated friction factor $f_c$ can be compared to the expected friction factor $f_e$. Variations in the two friction factors are indicative of a deviation in the flow meter parameter. According to one embodiment, the deviation may be caused by coating 310 in the flow meter 100. However, in other embodiments, the deviation may be caused by other situations, such as plugging, inconsistent process fluid mixture, bubbles in the process fluid, etc. If the calculated friction factor $f_c$ falls within a threshold limit of the expected friction factor $f_e$, meter electronics 20 can determine that either no or little deviation is present in the flow meter parameter. If on the other hand, the calculated friction factor $f_c$ falls beyond the threshold limit of the expected friction factor $f_e$, meter electronics 20 can send an alert that a deviation may be present within the flow meter parameter. According to one embodiment of the invention, the threshold limit may be predetermined based on the particular flow meter or flow characteristics. According to another embodiment of the invention, the threshold limit may be determined on site by the user or operator.

In addition to providing an accurate prediction of coating 230, among other things, this method may also determine a deviation in the flow meter parameter in the absence of an exactly known fluid viscosity. Depending on the flow rate of the fluid, a small change in viscosity may not result in a substantial change in the Reynold's number. Therefore, an average viscosity may be input by the user, without a further need to measure the viscosity.

According to another embodiment of the invention, a deviation in a flow meter parameter may be detected using temperature measurements. As the process fluid flows through the flow meter 100, the inlet temperature and the outlet temperature remain relatively close together. Similarly, the flow tube 101 and flow tube 102 remain at substantially the same temperature. According to an embodiment of the invention, the flow meter 100 includes two or more temperature sensors, such as RTDs 240. Although FIG. 2 only shows six RTDs, it should be understood that in other embodiments, the flow meter 100 may include more or less than six RTD sensors 240. The RTD sensors 240 can monitor the temperature of the flow tubes 101, 102. Coating 310, for example, may interfere with the fluid flow through the flow tubes 101, 102. Therefore, the coating 310 may also cause unusual variations in the temperature gradient from the inlet to the outlet of a given flow tube, either 101 or 102. Additionally, coating 310 may cause a temperature gradient from flow tube 101 to flow tube 102. Plugging may also affect the temperature gradient because little or no fluid is actually traveling through the flow meter 100.

Therefore, according to an embodiment of the invention, a deviation in a flow meter parameter may be detected based on a temperature gradient. More specifically, according to an embodiment of the invention, a deviation may be determined by tracking a change in the temperature gradient obtained from more than one temperature sensor, such as RTD sensor 240. According to one embodiment, the temperature gradient is measured from an inlet of the flow meter 100 to an outlet of the flow meter 100. According to another embodiment of the invention, the temperature gradient is measured from one flow tube 101 of the flow meter 100 to another flow tube 102 of the flow meter 100. According to an embodiment of the invention, coating 310 may be detected if a temperature gradient exceeds a temperature gradient threshold value. According to one embodiment, the temperature gradient threshold value comprises a predetermined value. According to another embodiment, the temperature gradient threshold is determined by a user or operator.

In some embodiments, the flow meter 100 may include a temperature gradient even in the absence of a deviation. Therefore, according to an embodiment of the invention, a deviation may be detected based on a change in the already existing temperature gradient.

The description above provides multiple methods for detecting a deviation in a flow meter parameter of a flow meter 100. According to an embodiment of the invention, the deviation in the flow meter parameter may be used to generate a diagnostic, which may be indicative of coating.

Each of the methods includes different advantages and the particular method employed may depend on the existing circumstances or equipment available. Some of the methods allow for a detection of a deviation in a parameter in the absence of a deviation in the flow rate measurement. In addition, more than one method or all of the methods discussed above may be incorporated into a single flow meter system. Therefore, meter electronics 20 may compare the detection of a deviation obtained using one method to the results obtained from another method.

The detailed descriptions of the above embodiments are not exhaustive descriptions of all embodiments contemplated by the inventors to be within the scope of the invention. Indeed, persons skilled in the art will recognize that certain elements of the above-described embodiments may variously be combined or eliminated to create further embodiments, and such further embodiments fall within the scope and teachings of the invention. It will also be apparent to those of ordinary skill in the art that the above-described embodiments may be combined in whole or in part to create additional embodiments within the scope and teachings of the invention.

Thus, although specific embodiments of, and examples for, the invention are described herein for illustrative purposes, various equivalent modifications are possible within the scope of the invention, as those skilled in the relevant art will recognize. The teachings provided herein can be applied to other flow meters, and not just to the embodiments described above and shown in the accompanying figures. Accordingly, the scope of the invention should be determined from the following claims.

We claim:

1. A method for detecting a deviation in a flow meter parameter of a Coriolis flow meter, comprising steps of:
    measuring a differential pressure across at least a portion of the Coriolis flow meter;
    determining an expected differential pressure based on a known fixed fluid viscosity;
    measuring a flow rate with the Coriolis flow meter;
    comparing the measured differential pressure to the expected differential pressure based on the measured flow rate; and
    detecting a deviation in the flow meter parameter if the difference between the measured differential pressure and the expected differential pressure falls outside of a predetermined threshold limit;
    wherein the deviation in the flow meter parameter indicates the presence of a coating in the Coriolis flow meter.

2. The method of claim 1, further comprising a step of measuring a differential pressure across the entire Coriolis flow meter.

3. The method of claim 1, wherein the expected differential pressure is obtained from a previously prepared plot of differential pressure v. flow rate.

4. The method of claim 1, further comprising a step of storing the expected differential pressure in a meter electronics.

5. A method for detecting a deviation in a flow meter parameter of a Coriolis flow meter, comprising steps of:
    measuring a differential pressure across the Coriolis flow meter;
    measuring a fluid flow rate with the Coriolis flow meter;
    calculating an expected fluid flow rate based on the measured differential pressure;
    comparing the measured fluid flow rate to the calculated fluid flow rate; and
    detecting a deviation in the flow meter parameter if the difference between the measured fluid flow rate and the calculated fluid flow rate exceeds a predetermined threshold limits;
    wherein the deviation in the flow meter parameter indicates the presence of a coating in the Coriolis flow meter.

6. The method of claim 5, further comprising a step of determining a flow meter coefficient.

7. The method of claim 5, further comprising a step of storing the expected fluid flow rate in meter electronics.

* * * * *

UNITED STATES PATENT AND TRADEMARK OFFICE
CERTIFICATE OF CORRECTION

PATENT NO. : 10,480,977 B2
APPLICATION NO. : 12/936564
DATED : November 19, 2019
INVENTOR(S) : Timothy J. Cunningham and Andrew Timothy Patten It is certified that error appears in the above-identified patent and that said Letters Patent is hereby corrected as shown below:

In the Specification

Column 7, Line 28, replace "v=kinematic fluid viscosity" with -- u=kinematic fluid viscosity --

Column 8, Lines 8, 10, 16, 34, 42 and 51, and Column 9, Lines 9 and 20, for the friction factor symbol, replace "f" with -- $f$ --

Column 9, Lines 35, 56, 57 and 64, and Column 10, Line 1, replace "f_c" with -- $f_c$ --

Column 9, Lines 37, 39, 42, 44, 47, 58, and 65 and Column 10, Line 2, replace "f_e" with -- $f_e$ --

Signed and Sealed this
Ninth Day of June, 2020

Andrei Iancu
*Director of the United States Patent and Trademark Office*